United States Patent [19]

Steinhardt

[11] 4,057,188

[45] Nov. 8, 1977

[54] DEEP DRAWN PLASTIC PACKING CASE WITH INTERLOCKING, HOLLOW FASTENER PROJECTIONS

[76] Inventor: Dieter Steinhardt, Penzingerstr. 117, Vienna, Austria, 1140

[21] Appl. No.: 733,922

[22] Filed: Oct. 19, 1976

Related U.S. Application Data

[62] Division of Ser. No. 612,240, Sept. 11, 1975, abandoned.

[30] Foreign Application Priority Data

Sept. 16, 1974 Austria .................................. 7478/74
May 13, 1975 Austria .................................. 3657/75

[51] Int. Cl.² ............................................. B65D 1/26
[52] U.S. Cl. ............................ 229/29 M; 229/2.5 EC; 229/44 EC
[58] Field of Search ........... 229/2.5 EC, 2.5 R, 29 M, 229/44 EC, 45, 52 B

[56] References Cited

U.S. PATENT DOCUMENTS

| | | | |
|---|---|---|---|
| 2,974,842 | 3/1961 | Reifers | 229/29 M X |
| 3,351,270 | 11/1967 | Hohnjec | 229/52 B X |
| 3,356,277 | 12/1967 | Hohnjec | 229/44 EC |
| 3,421,682 | 1/1969 | Eisenbach | 229/44 EC X |
| 3,655,110 | 4/1972 | Eisenbach | 229/2.5 EC |

*Primary Examiner*—Davis T. Moorhead
*Attorney, Agent, or Firm*—John Dennemeyer

[57] ABSTRACT

A device for producing hollow, undercut projections on a packing case of thermoplastic sheet material in a deep drawing mold which comprises at least one projecting stem at whose free end a core having a laterally projecting nose may be pivoted around a transverse pin and is elastically supported against the action of a spring. The stem and core are covered by the heated plastic sheet during the deep drawing process to provide the undercut projection, and during the removal of the finished packing case the core is pivoted around its pin to a position in which its laterally projecting nose releases the undercut part of the projection on the packing. The hollow undercut projections on the packing case thus produced are hook shaped and a hollow shaft projecting from one of the packing halves changes to a hollow projection extending almost vertically from the shaft and in the locked position this projection intermeshed with a similar projection of a hollow shaft on the other packing half. Spacer projections are provided on the top side of each packing case half to abut with each other when the packing case is closed and they are in part undercut to prevent an intermeshing when the packing cases are slacked together.

5 Claims, 15 Drawing Figures

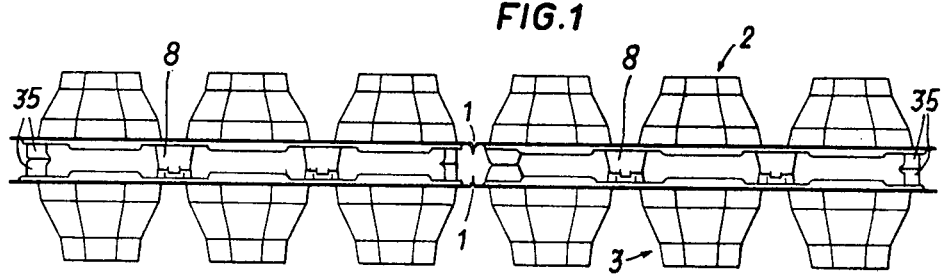
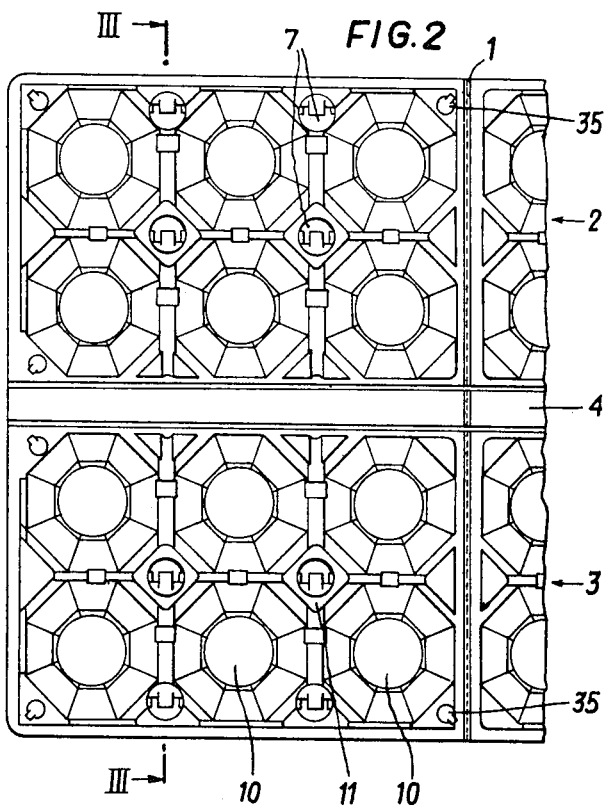

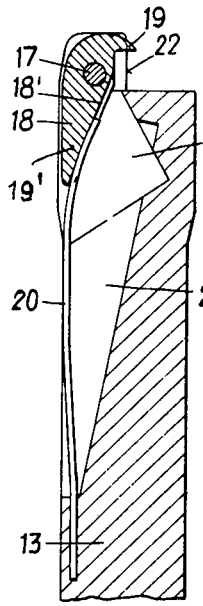
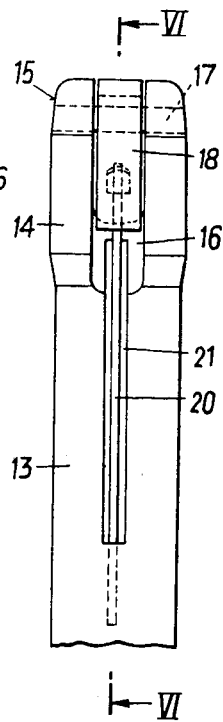
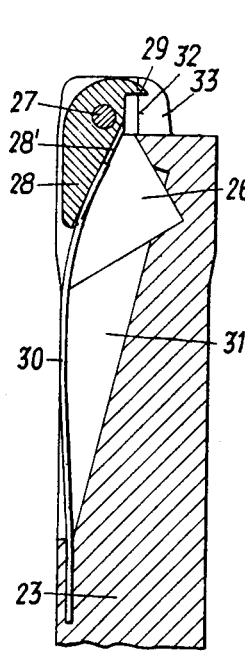
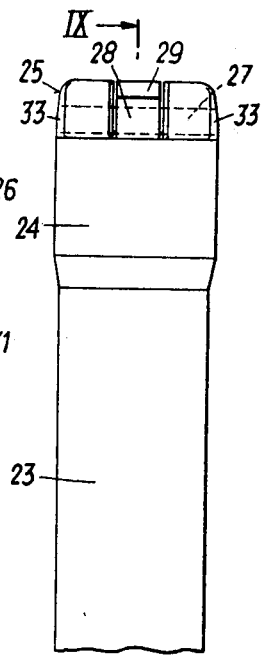
FIG. 6  FIG. 5  FIG. 9  FIG. 8
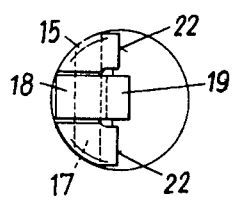
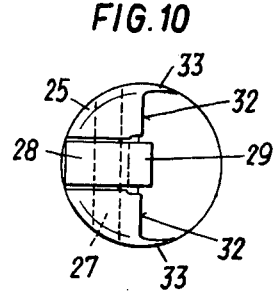
FIG. 7  FIG. 10

DEEP DRAWN PLASTIC PACKING CASE WITH INTERLOCKING, HOLLOW FASTENER PROJECTIONS

This is a division, of application Ser. No. 612,240, filed Sept. 11, 1975 now abandon.

The present invention relates to a device for manufacturing hollow undercut projections on thermoplastic packing cases in a deep drawing mold, and concerns more particularly various novel features in such packing cases to provide an improved use for such packing cases in several respects.

The packing cases available today comprise for example recesses for receiving eggs, fruit or the like, and at least the edges of the packing halves which come into contact during the locking of the packing case are folded together like a book, comprise hollow projections that are integral therewith and intermesh in pairs to provide a lock for the two packing halves.

In the known packing cases of the above type, the projections intermesh like push buttons, in that they either are undercut so that a sufficient adhesion is possible, or projecting protuberances are provided on the one packing half which resiliently intermesh in a hole-like recess of a projection on the other packing half and produce a friction contact.

The above described manner of locking such packing cases has been accepted worldwide, but it is still in need of improvement. If for example a slightly stronger plastic sheet is used, which is necesssary when manufacturing a packing case for twelve eggs, difficulties occur when the locking elements are formed during the thermoplastic deep drawing of the sheet. Furthermore special machines are required which are designed in relation to the type of push button lock used for automatically locking of the packing cases after the insertion of the goods, which makes the packing operation more expensive. It is also considered useful that the packing case can be opened and locked repeatedly, which is not always possible with the known fragile push button locks.

It is therefore an object of the present invention to eliminate the above disadvantages and to provide also a substantial simplification of the locking operation. Thus for example the lock should not open by itself because the goods which the packing contains are generally delicate. On the other hand it is very important that the packing case can be locked by means of simple devices and opened by hand as often as necessary without causing damage to the locking parts.

Thermoplastic packing cases for eggs, fruit and the like are generally formed by deep drawing of a heated plastic sheet and are subsequently piled one on top of the other and into one another, so that they can be transported in a compact manner. During the packing operation of the goods each of the packing cases has to be taken off one after the other from the pile by means of a suitable apparatus to be taken to the packing point. This procedure, also called de-nesting, is difficult because the weight of the pile causes an adhesion between the different packing cases which disturbs the packing process, and it is therefore important that the adhesion of the packing cases be eliminated.

For this purpose it has already been proposed to provide some non-uniform points on uniform packing cases, for example projections or recesses so arranged that two packing cases piled one on the other are provided with projections and are respectively recessed at different points. By coincidence it still happens that two packing cases which are completely identical are piled directly one on the other, whereby the above described inconvenience takes place and a proper removal by means of an automatic device is not possible.

It has now been found that the above disadvantages can be solved satisfactorily by means of a device whose design is based on the same fundamental concept. The device according to the invention permits on the one hand the manufacturing of a very efficient lock which is substantially superior to the push button lock used to date and on the other hand the tool according to the invention can be used to manufacture spaced projections on the packing case, which permits an easy removal of the piled packing cases for taking to the packing point.

Accordingly the present invention relates to a device for manufacturing hollow, undercut projections on a packing case of thermoplastic sheet material manufactured by means of a deep drawing mold in which the mold comprises at least one projecting stem or the like at whose free end a core comprising a lateral projection or nose can be pivoted around a transverse pin and is elastically supported against the action of a spring, which core, together with the stem, is covered by the heated plastic sheet during the deep drawing process in order to provide the undercut projection, and during the removal of the finished packing case the core is pivoted around its pin to a position in which its lateral projection or nose releases the undercut part of the projection on the packing.

The invention relates further to a packing case made of a deep drawn plastic sheet, manufactured by means of the above device, consisting of two halves which are joined by a web, and comprising recesses to receive eggs, fruit and the like, whereby at least the edges of the two packing halves disposed one above the other during the closing operation of the packing case comprise hollow projections which are integral therewith and intermesh by pairs to provide a lock. It is essential for the packing case according to the above invention that the hollow projections are hook shaped, wherein a hollow shaft projecting from one of the packing halves changes to a hollow projection extending almost vertically from the shaft, which in the locked position intermeshes with a similar projection of a hollow shaft on the other packing half.

Finally the invention relates also to a packing case of a deep drawn plastic sheet, preferably consisting of two halves joined by a web, which have recesses or depressions for example to receive eggs, fruit or other goods, at least the edges of the two packing halves which come into contact during the locking of the packing cases having locking parts which are integral with the packing halves and intermeshing, and wherein spacer projections are provided which are disposed one on top of the other when the packing case is locked and whose height corresponds to the distance of the edges of the packing halves provided by the height of the web between the packing halves. The improvement of this packing case consists in that at least one part of the spacer projections are undercut so that an intermeshing of these projections is eliminated when the empty packing cases are piled on top of each other.

The invention will now be explained in greater detail by referring to embodiments shown on the accompanying drawings wherein:

FIG. 1 shows a packing case according to the invention in a closed state,

FIG. 2 is a top view of the packing case according to FIG. 1 in the open state,

Figure 3:
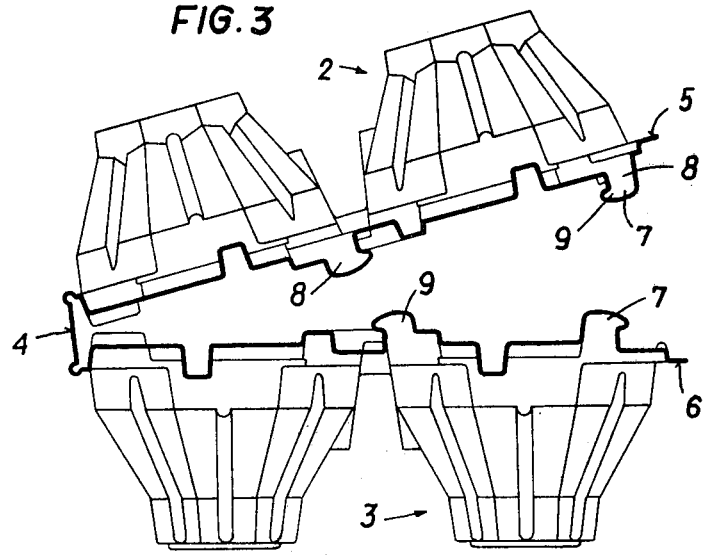
Figure 4:
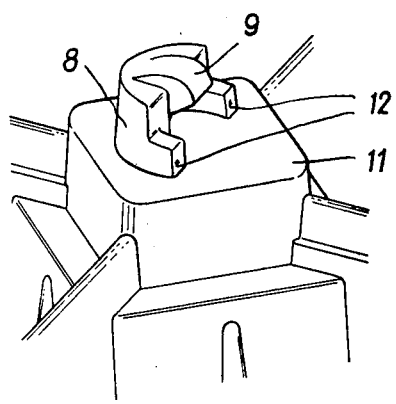
Figure 11:
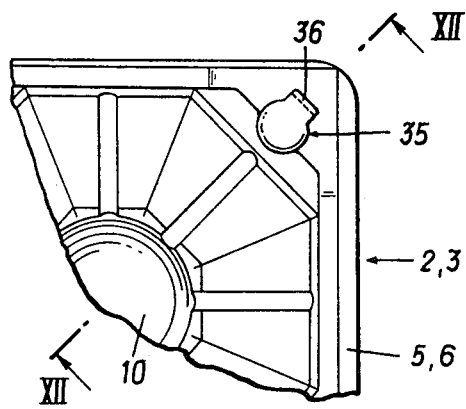
Figure 12:
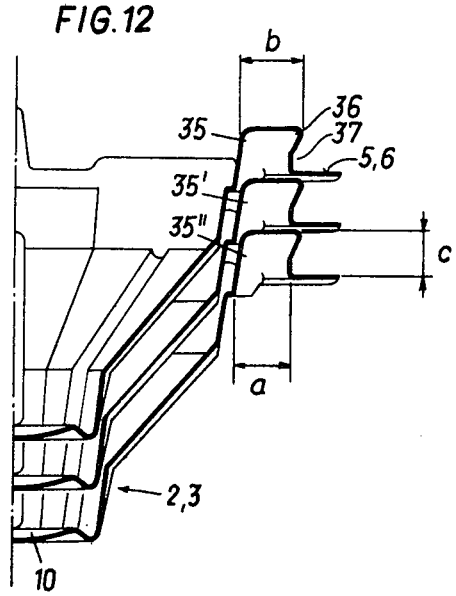
Figure 13:
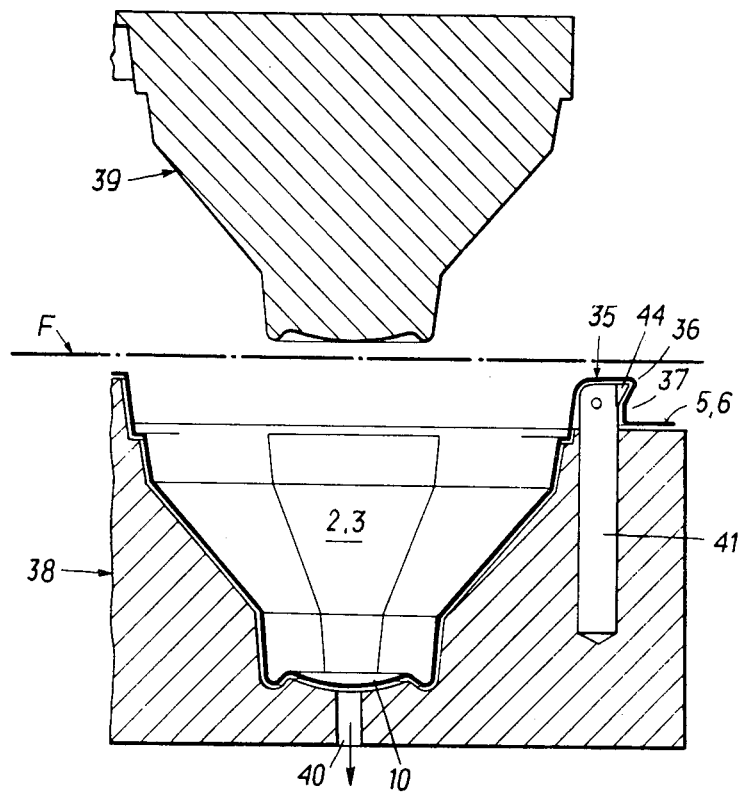
Figure 14:
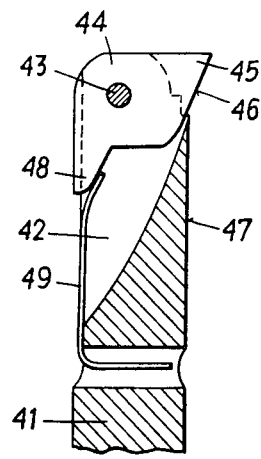

FIG. 3 shows a section through the packing case according to line III—III of FIG. 2, just before locking, FIG. 4 shows a locking part in a perspective view, FIGS. 5, 6 and 7 show one embodiment of a tool for manufacturing the locking parts of the packing case respectively partly in section, in a front view and in a rear view, FIGS. 8, 9 and 10 show an other embodiment of a tool for manufacturing the locking parts of the packing case also respectively partly in section, in a front view and in a rear view, and FIGS. 11 through 15 show the shape of spacer projections provided on the packing case of the invention and the corresponding tool for producing this shape.

In FIGS. 1 through 3 an improved embodiment according to the present invention of a known plastic packing case of thermoplastic sheet material is shown, as described for example in Austrian Patent No. 287 580. It relates to a double packing case for twelve eggs which can be separated into two parts along a separating or parting line 1, if desired. The packing case particularly comprises, aside from details, substantially two halves, namely an upper part 2 and a lower part 3, the halves being joined by a web 4 which constitutes a hinge. Accordingly the packing case consists of one piece, that is to say, that all the parts formed during the deep drawing process of a heated plastic sheet consist of the same sheet and are manufactured during a single operation.

To lock the packing case, after having inserted the packing goods, for example eggs, which is normally done by means of an automatic machine, first the protuberances 7 provided by deep drawing on the edges 5, 6 opposite the web 4 are provided as locking elements which are hook shaped. These elements are hollow projections in the form of a hollow stem 8 projecting from the one packing half, and changing into an ear 9 projecting vertically from the stem. This ear 9 intermeshes with a similar ear 9 of a hollow stem 8 on the other packing half in the locked position, which is already sufficient to keep the packing case closed. Accordingly the packing case can only be opened by producing a slight deformation.

This type of locking parts 7 are not only provided on the edges of the packing case but also in the center thereof, as shown in FIG. 2. There are at least two hollow protuberances or projections 8 provided on one and the same packing half and arranged opposite each other, which offers a supplemental safety against an unexpected opening of the packing case. This disposition of the locking parts 7, 8, 9 is a kind of transverse locking, whereby the locking parts of the edges eliminate the unexpected opening of the locking parts disposed in the center of the packing halves.

The shape of the hollow locking parts may vary. An embodiment used in practice is shown in FIG. 4 in a perspective view, wherein this locking part is provided to be disposed in the center of a packing half. As shown in FIGS. 2 and 4, a squared separating projection or abutment surface 11 is provided in the center of four packing recesses 10 having a size which corresponds to the height of the web 4 joining the packing halves 2, 3, which is overhung by a hollow stem 8. This stem changes at its upper end into an ear 9 projecting vertically from the stem and forming together a hollow locking hook. On the hollow stem 8, graduated lateral parts 12 are provided to produce a supplemental locking during the mutual intermeshing of the locking parts.

In FIGS. 5 through 10 the essential parts of the tool for manufacturing the locking parts of the packing case as shown in FIGS. 1 through 4 are illustrated.

In FIGS. 5 and 6 a tool stem made of brass is shown which is used in a usual deep drawing mold for manufacturing egg packing cases especially at those points where a locking part has to be formed. This stem 13 comprises at its thickened upper part 14 a conical stem head 15, which has a slot-like recess 16 for supporting the core 18 in the form of a latch by means of a pin 17.

The core 18 comprises at its upper end a projection or nose 19, projecting laterally in the form of a hook from the core itself. At the opposite end to this nose 19 the core 18 comprises an extension 19' converging in the downward direction. At the inner inclined surface of this extension a leaf spring 20 is lodged in a slot 18', which holds the core 18 in its normal position.

The recess 21 extends so far into the stem 21 that the extension 19' may be pivoted inwardly by 45°. In this inwardly pivoted position the pointed nose 19 is pivoted so far upwardly around the axis 19 that it does not constitute an obstacle during the removal of the packing case.

During the deep drawing process, the preheated plastic sheet having a temperature of more than 100° C lies closely against the surfaces of the deep drawing mold and also against the stem 14 as well as the front edge 22 and core 18 with its nose 19 which constitutes an undercut. If the core 18 were not pivotally supported, the formed packing case could not be removed out of the deep drawing mold. The flexible support of the core 18 permits a pivoting of the nose 19 in an upward direction and thereby the easy removal of the formed packing case out of the deep drawing mold. It will be understood that the described tool parts 13–22 form a locking part of the type shown in FIG. 4 during the deep drawing of the sheet.

In FIGS. 8–10 a shaft 23 together with a core 28 is shown which is similar to the one as shown in FIGS. 5–7 and forms, during the deep drawing process, a hollow projection on the packing case which cooperates as a locking part with the projection formed by means of the stem 14. The difference resides in the fact that at the thickened upper part 24 of the stem 23 two lateral projections 33 are formed, which are spaced from each other so that they laterally cover the upper part 14 of the stem 13. The stem 23 of this tool further comprises a thickened upper part 24, a conical stem head 25 and a recess 26 for a core 28, which can be pivoted around a shaft 27 against the action of a spring 30.

The known packing cases comprised projections in the corners for providing a spacing of the edges. The packing cases shown in FIGS. 11 and 12 comprise spacer buttons 35, 35', 35" each having an undercut portion 37, which eliminate an adhesion between the packing cases during the stacking of empty packing cases not yet filled with packing goods.

The inner width of such a spacer botton 35" (FIG. 12) is, when seen from below, smaller than the outer width $b$ of the surface of the spacer button seen from the opposite side. This design prevents that the spacer button 35' of a packing case 2, 3 disposed below, enters into the recess of the same spacer button 35 of the packing cases disposed one above the other so that an interval c of the piled packing cases corresponding to the height of these projections is obtained. Accordingly the removal of each of the packing cases by reaching with the gripping means under the edges of the upper packing case and to picking it up from the pile presents no difficulties.

Of course, the described undercut projections or spacer buttons 35 are still providing the usual function of spacing two packing halves 2, 3 when locked.

Accordingly the invention permits that completely similar packing cases can be piled one on top of the other while maintaining a spaced relationship without adhering to one another in spite of the weight of the pile. Therefore only one type of mold is required to manufacture these packing cases.

Figure 15:
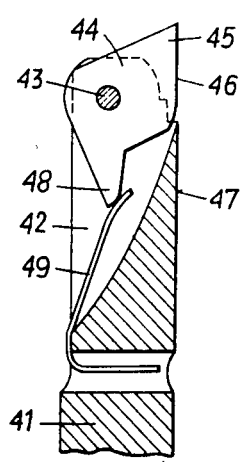

The forming tool for the spacer buttons of the packing cases comprises a cylindrical stem 41 which is disposed in the lower mold part 38 of the multipart deep drawing mold 37, 38 and comprises at its upper end a hinged nose or latch 44. The stem 41 comprises a slot 42 in which the nose 44 is pivotably mounted by means of a pin 43. A spring 49 engages at one end the lower extension 48 of nose 44 and penetrates with its other leg into a bore in the stem 41. In this way the nose is brought back into its initial position when the tool is removed from the formed packing case. The easy removal of the nose is made by the fact that the projecting lower edge 46 of the nose 44, 45 is in alignment with the contour 47 of the stem 41 after the swinging movement (FIG. 15).

The manufacture of the packing case is obtained in the usual way by deep drawing of a preheated plastic sheet in a mold 38, 39, wherein air is sucked through the opening 40 to provide that the sheet comes into close contact with the surfaces of the mold. In the corners of the mold the above described forming tool is mounted in such a way that it forms an angle of 45° with reference to the edges of the packing case.

The undercut spacer button may of course have any other sectional form as this is not essential. However, it is essential that the spacer buttons have such a form as to eliminate an intermeshing of the spacer buttons due to the pressure of the weight of the packing cases when piled on top of each other.

The invention is basically appropriate to solve the adhesion problems of all types of packing cases piled on top of each other thus also for packing which are formed in a single piece, and suitable to receive all kinds of goods.

What is claimed is:

1. A packing case produced of deep drawn plastic sheet material, comprising two halves joined by a web and provided with recesses for receiving appropriate goods, at least the edges of the two packing halves coming into contact one over the other during the locking of the packing case having hollow projections which are integral with the packing halves and intermeshing by pairs to constitute a locking part, the improvement consisting in that the hollow projections are hook shaped and a hollow stem projecting from the one packing half changes into a hollow nose projecting vertically from said stem and intermeshes in the locking position with a similar nose of a hollow stem on the other packing half.

2. Packing case according to claim 1, wherein at least two hollow projections are disposed on one and the same packing half in an opposed relationship.

3. Packing case according to claim 2 comprising spacer projectiong having a size which corresponds to the height of the web joining the two packing halves, wherein the hollow projections providing a locking part are disposed on the spacer projections, selectively in a counter-sunk arrangement.

4. Packing case consisting of deep drawn plastic sheet material consisting preferably of two halves joined by a web and provided with recesses for receiving appropriate goods, at least the edges of the halves coming into contact during the locking of the packing case comprising locking parts which are integral therewith and intermesh, spacer projections being provided with come into contact one above the other during the locking of the packing case, the height of the projections corresponding to the distance of the edges of the packing halves provided by the projections or by the height of the joining web between the packing halves, the improvement consisting in that at least some of the spacer projections are undercut so that an intermeshing of these projections during the stacking of empty packing cases is eliminated.

5. A packing case according to claim 4, wherein said locking parts comprise: hollow projections which are integral with the packing halves and which are arranged to intermesh by pairs to form a lock, the improvement consisting in that the hollow projections forming the locking parts are hook shaped and a hollow stem projecting from the one packing half changes into a hollow nose projecting vertically from said stem and intermeshes in the locking position with a similar nose of a hollow stem on the other packing half.

* * * * *